(No Model.) 5 Sheets—Sheet 2.

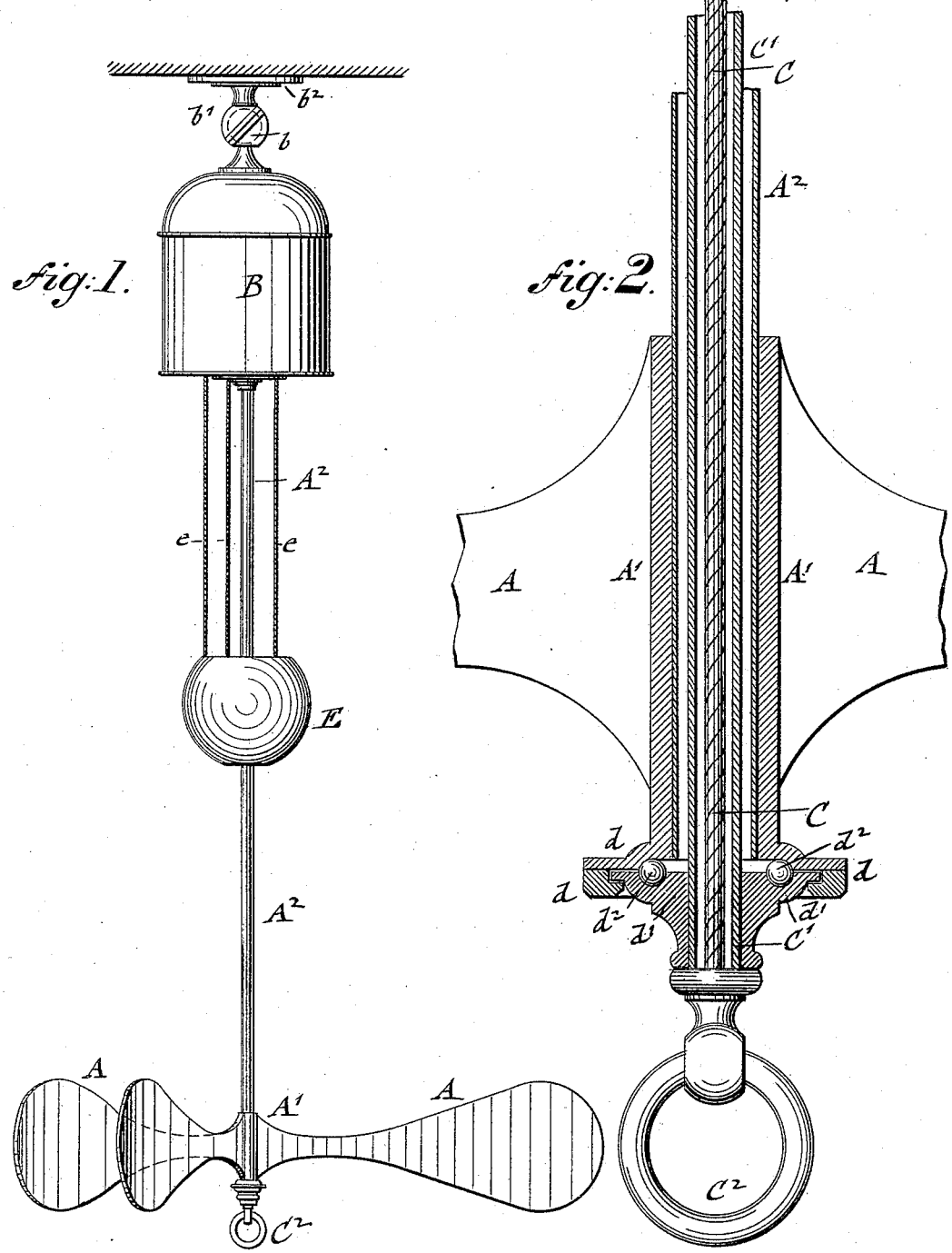

R. GODEFFROY.
ROTARY FAN.

No. 395,620. Patented Jan. 1, 1889.

WITNESSES:
A. Schiehl.
Henry Huber

INVENTOR.
R. Godeffroy
BY Goepel & Raegener
ATTORNEYS.

(No Model.) 5 Sheets—Sheet 3.
R. GODEFFROY.
ROTARY FAN.
No. 395,620. Patented Jan. 1, 1889.
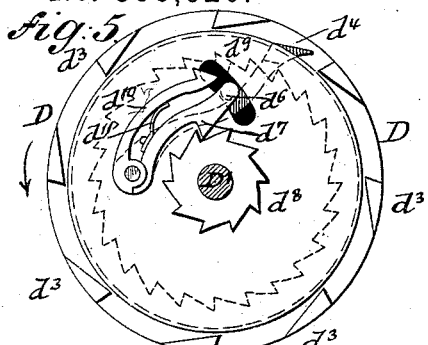
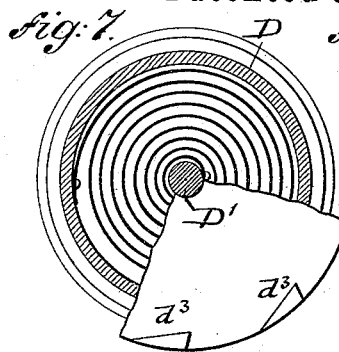
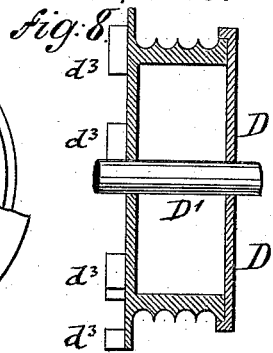
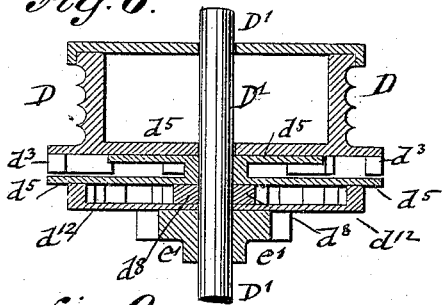
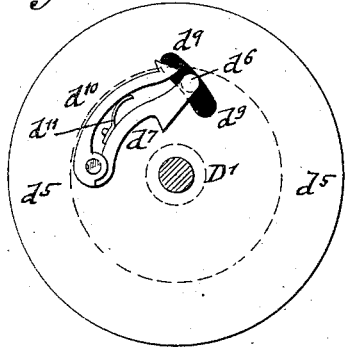
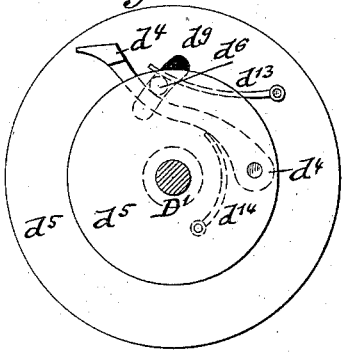
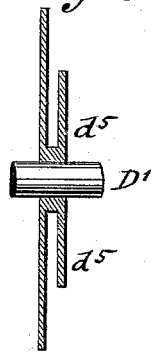
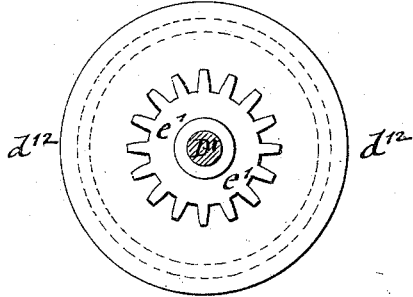
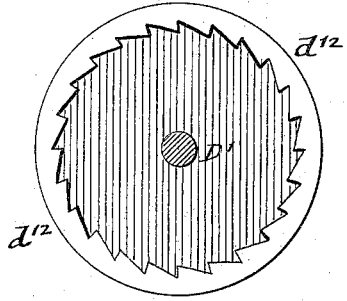
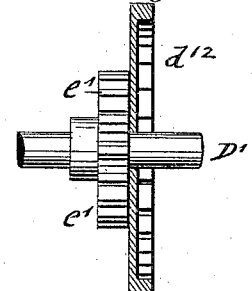
WITNESSES:
A. Schehl.
Henry Huber.
INVENTOR,
R. Godeffroy.
BY
Gopuer & Raegener
ATTORNEYS.
N. PETERS. Photo-Lithographer, Washington, D. C.

(No Model.) 5 Sheets—Sheet 4.
R. GODEFFROY.
ROTARY FAN.
No. 395,620. Patented Jan. 1, 1889.
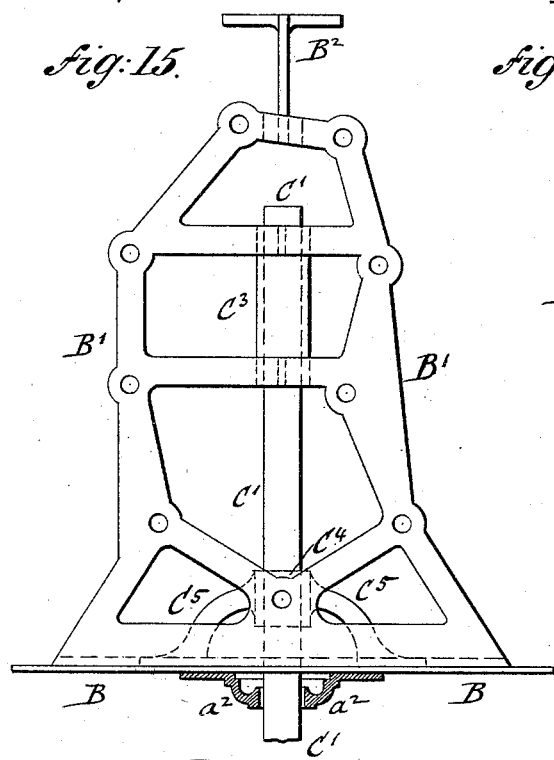
Fig. 15.
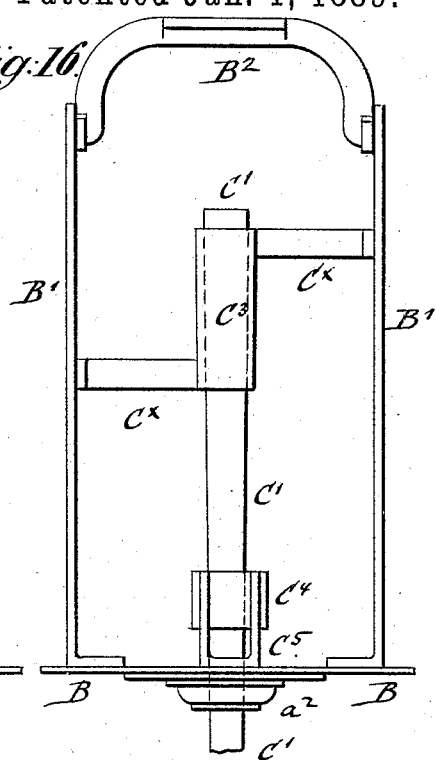
Fig. 16.
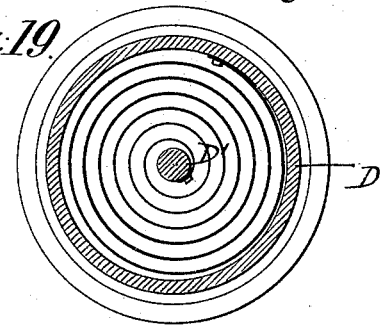
Fig. 19.
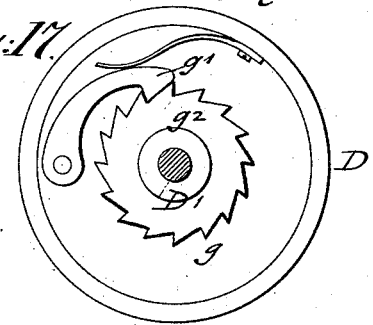
Fig. 17.
Fig. 20.
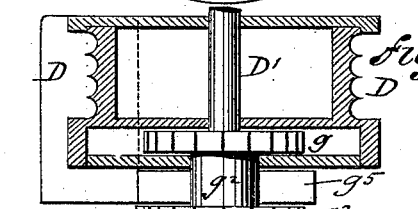
Fig. 18.
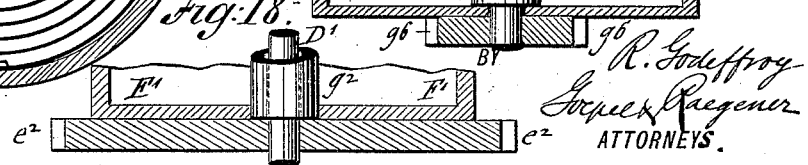
Fig. 18ª.
WITNESSES:
A. Schehl.
Henry Huber
INVENTOR
R. Godeffroy
BY Toepel & Raegener
ATTORNEYS.

(No Model.) 5 Sheets—Sheet 5.

R. GODEFFROY.
ROTARY FAN.

No. 395,620. Patented Jan. 1, 1889.

WITNESSES:
A. Schehl.
Henry Huber

INVENTOR.
R. Godeffroy
BY
Jocque & Raegener
ATTORNEYS.

UNITED STATES PATENT OFFICE.

RICHARD GODEFFROY, OF WASHINGTON, DISTRICT OF COLUMBIA.

ROTARY FAN.

SPECIFICATION forming part of Letters Patent No. 395,620, dated January 1, 1889.

Application filed June 9, 1888. Serial No. 276,563. (No model.)

*To all whom it may concern:*

Be it known that I, RICHARD GODEFFROY, of Washington, in the District of Columbia, have invented certain new and useful Improvements in Rotary Fans, of which the following is a specification.

This invention relates to an improved rotary fan for ventilating and cooling rooms, which fan is driven by means of a clock-train actuated either by a weight or spring, so as to be applicable to places in which no steam or other power is available.

The invention consists, essentially, of a rotary fan which is mounted on a tubular fan-shaft that is operated by a prime motor and a train of transmitting-gearing between the motor and the fan-shaft. The prime motor is wound up by a spring-barrel and a cord that passes through a fixed guide-tube located inside of the tubular fan-shaft, said spring-barrel being connected with the transmitting-train of gear-wheels by a pawl-and-ratchet mechanism, by means of which the motor is either wound up or released for actuating the train and fan-shaft.

The invention consists, further, of certain details of construction and combination of parts, which will be fully described hereinafter, and finally be pointed out in the claims.

Figure 3:
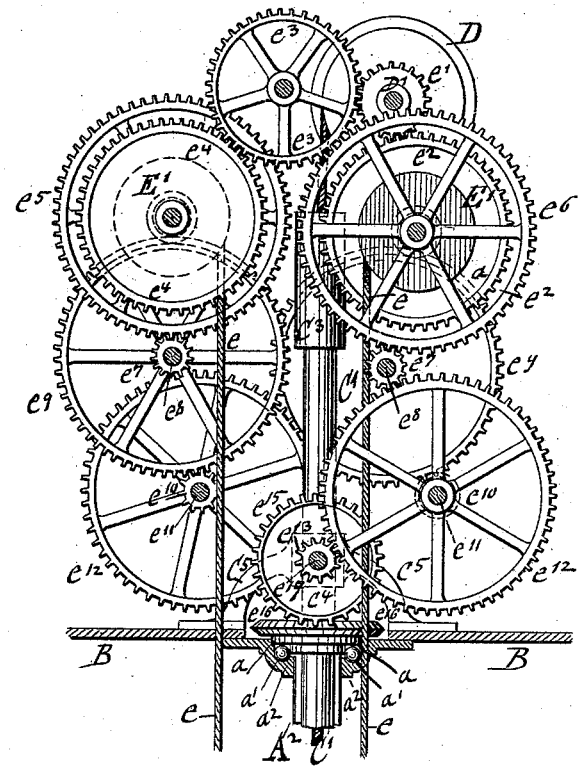
Figure 4:
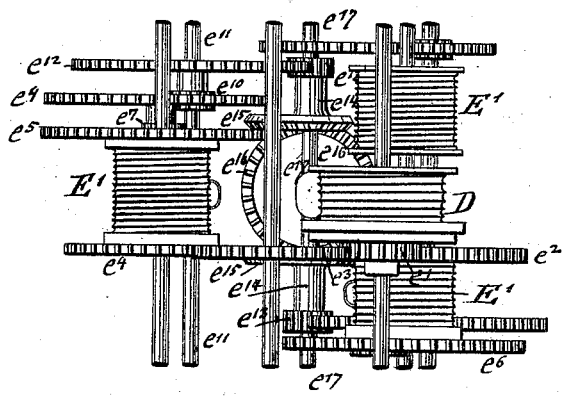
Figure 21:
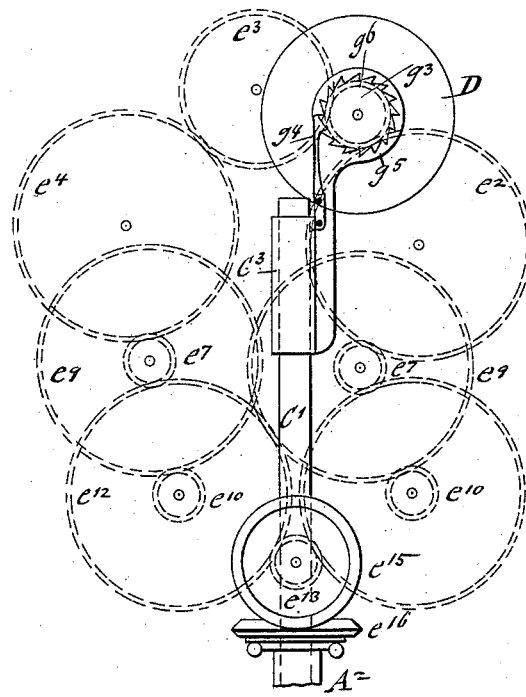
Figure 23:
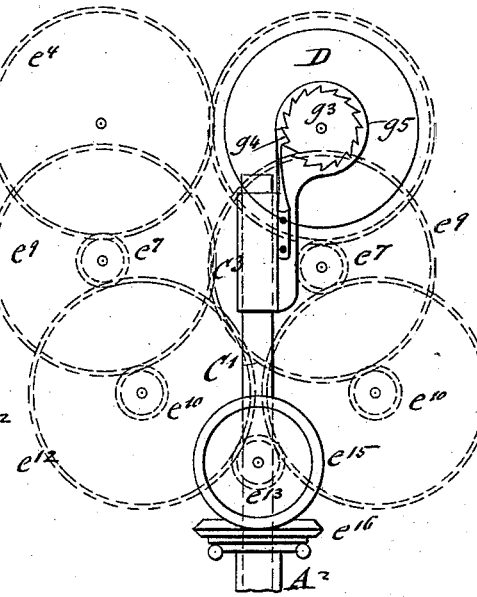
Figure 22:
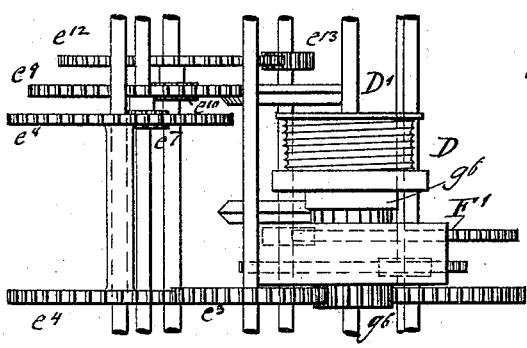
Figure 24:
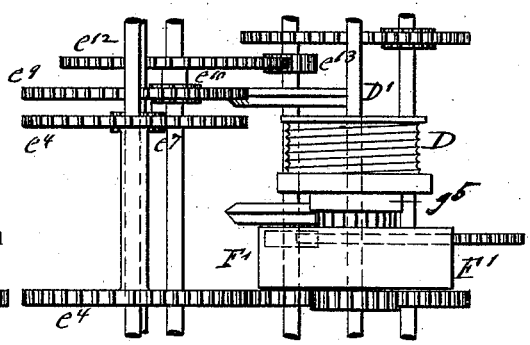

In the accompanying drawings, Figure 1 represents a side elevation of my improved rotary fan, showing the same suspended from the ceiling and operated by a clock-train driven by a weight. Fig. 2 is a vertical central section of the fan hub and shaft, drawn on a larger scale and showing the interior tube and cord for raising the weight and winding up the spring-barrel of the clock-train. Fig. 3 is a sectional side elevation, with the casing removed, of the clock-train by which motion is imparted to the fan-shaft. Fig. 4 is a plan of Fig. 3. Figs. 5, 6, 7, 8, 9, 10, 11, 12, 13, and 14 are details of the winding-up barrel and its pawl-and-ratchet mechanism. Figs. 15 and 16 are respectively a side and an end elevation of the frame for supporting the clock-train for driving my improved rotary fan. Figs. 17, 18, 18$^a$, 19, and 20 are details of a spring-barrel and winding-up barrel employed for driving the clock-train by spring-power. Figs. 21 and 22 are a side elevation and plan of a simplified construction of a clock-train driven by spring-power, and Figs. 23 and 24 are a side elevation and plan of a modified construction of the spring-actuated clock-train.

Similar letters of reference indicate corresponding parts.

Referring to the drawings, A represents a fan, and A' the hub of the same, which is applied to a hollow shaft, A², that is supported at its upper end by a collar, $a$, on anti-friction rollers $a'$, located in a grooved collar, $a^2$, at the bottom of the casing B, which incloses the clock-train by which motion is imparted to the fan-shaft A². The casing B is suspended by a ball-and-socket joint, $b\ b'$, from a supporting-plate, $b^2$, attached to the beams of the ceiling or other suitable support, as shown in Fig. 1, so as to assume always a vertical position by its own weight.

The clock-train is driven either by a weight or spring, respectively wound up by a cord, C, which is made from gut-strings, wires, or other suitable material, said cord being attached at its lower end to the socket of a ring, C², and passed through a fixed tube, C', onto a spirally-grooved spring-barrel, D, to which the upper end of the cord C is attached. The lower end of the fan-shaft A² is supported by a collar, $d$, having a bent circumferential flange on a grooved collar, $d^2$, at the lower end of the fixed tube C', the friction between the fan-shaft A and collar $d'$ being taken up by anti-friction balls $d^3$, as shown clearly in Fig. 2. The tube C' passes upward into the casing B, and is secured at its upper end to a fixed sleeve, C³, which is connected by lateral arms C$^\times$ to a supporting-frame at the interior of the casing B. The tube C' is also supported immediately above the bottom of the casing B by a second sleeve, C⁴, that is supported by yoke-shaped arms C⁵ at the bottom of the casing, as shown in Figs. 3, 15, and 16. The supporting-frame is composed of two side standards, B', which are connected at the upper part by a yoke, B², at the middle part by the lateral arms C$^\times$ of the sleeve C³, and at the lower end by the bottom of the casing B. The standards B' are provided with the required number of journal-bearings for the shafts of the different motion-transmitting drums and gear-wheels of the clock-train, by which rotary motion is imparted to the fan-shaft $A^2$.

When the clock-train is driven by a weight, E, as shown in Figs. 1, 2, 3, and 4, the same is suspended by three cords, $e$, which pass through openings in the bottom of the casing B to three spirally-grooved drums, E′, which are clearly shown in Fig. 4, the suspension-cords being gradually wound up on said drums alternately by pulling and releasing the winding-up cord C. The cord C is attached to a spring-barrel, D, from which motion is transmitted by certain intermediate mechanisms to the drums E′.

The intermediate transmitting mechanism is shown in Figs. 5 to 14, and consists of a lever, $d^4$, which is engaged by lateral projections $d^3$ at the circumference of the spring-barrel D and pivoted to a U-shaped disk, $d^5$, keyed to the shaft D′ of the spring-barrel D. The lever $d^4$ engages a pin, $d^6$, at the outer end of a pawl, $d^7$, which latter engages a fixed ratchet-wheel, $d^8$, on the shaft of the spring-barrel D, as shown in Fig. 5. The pawl $d^7$ is also pivoted to the U-shaped disk $d^5$, its pin $d^6$ passing through a slot, $d^9$, of the same into the path of the lever $d^4$. The lever $d^4$ is applied to the smaller disk of the U-shaped disk $d^5$, while the pawl $d^7$ is applied to the larger outer part of the same. The lever $d^4$ and the pawl $d^7$ are applied to the same pivot, to which is further applied a pawl, $d^{10}$, between which and the pawl $d^7$ a spring, $d^{11}$, is interposed. The pawl $d^{10}$ serves to engage a ratchet-wheel, $d^{12}$, placed loosely on the shaft D and formed of a flanged disk having teeth at the inner circumference of the flange, as shown in Figs. 13 and 14.

On pulling the cord C downward the spring-barrel D is turned to the left, so that one of its eight lateral projections, $d^3$, engages the lever $d^4$ and carries the same along toward the left. The lever $d^4$ engages the pin $d^6$ and withdraws the pawl $d^7$ from the teeth of the ratchet-wheel $d^8$ on the shaft of the spring-barrel D, throwing at the same time the pawl $d^{10}$ into engagement with the teeth of the ratchet-wheel $d^{12}$, so that the U-shaped disk $d^5$ and ratchet-wheels $d^8$ and $d^{12}$ are all turned with the barrel D toward the left. The spring between the pawls $d^7$ and $d^{13}$ serves for the purpose of allowing the pawl $d^{10}$ to give way in case two of the teeth of the ratchet-wheels $d^5$ and $d^{11}$ should chance to be in line with each other, so that the pawl $d^7$ would be prevented from being lifted out of the teeth of the ratchet-wheel $d^8$. The pawls $d^7$ and $d^{10}$ are provided at their pivoted ends with abutting shoulders $d^\times$, as shown in Figs. 5 and 9, which is necessary for the purpose of preventing the simultaneous engagement of the teeth of both ratchet-wheels $d^8$ and $d^{12}$ by said pawls at the same time, as one pawl carries thereby the other along. When by the pulling of the cord C the spring-barrel is turned to the left, the intermediate mechanism described carries the ratchet-wheel $d^{12}$ and a gear-wheel, $e′$, attached to the same, along and turns it with the spring-barrel D. The gear-wheel $e′$ meshes directly with a gear-wheel, $e^2$, on the shaft of two of the cord-drums E′, and by an intermediate gear-wheel, $e^3$, with a gear-wheel, $e^4$, on the shaft of the third drum E′. The gear-wheels $e′$ $e^2$ are keyed to their shafts and also the drums E′, so that the latter will partly wind up the three suspending-cords $e$ of the actuating-weight. On releasing the ring $C^2$ at the lower end of the winding-up cord C the spiral spring at the interior of the spring-barrel D will turn the same to the right and rewind the cord C. The lever $d^4$ will then be released and the pawl $d^7$ pressed by a spring, $d^{13}$, that acts on the pin $d^6$, back into engagement with the gear-wheel $d^8$, withdrawing thereby the pawl $d^{10}$ from the teeth of the ratchet-wheel $d^{12}$. During the return motion of the spring-barrel D the projections $d^3$ slip over the lever $d^4$, which latter springs back into the intervals between the projection $d^3$ by the action of its spring $d^4$.

As regards the three springs $d^{11}$, $d^{13}$, and $d^{14}$, which are used for the pawls $d^{10}$ $d^7$ and the lever $d^4$, it is necessary that the spring between the pawls $d^7$ and $d^{10}$ be the strongest, as it has only to give way occasionally and under a very strong pressure of the lever $d^4$. The spring $d^{13}$, which actuates the pawl $d^7$, has to be weakest, as it has only to press the pin $d^6$ of the pawl $d^7$ against the lever $d^4$ and move it into the path of the projections $d^3$, so that it may be engaged by the same when the spring-drum is turned to the left. Care must be taken that the spring $d^{14}$, which actuates the lever $d^4$, is not strong enough so as to move the pawl $d^7$ without the action of the projection $d^3$.

To the shafts of the winding-drums E′ are applied, by the usual pawl and ratchet-wheel connection, gear-wheels $e^5$ $e^6$, which are carried along when the drums are winding up the weight, but carried along by the drums when they are turned in the opposite direction by the descending motion of the weight. The gear-wheels $e^4$, $e^3$, $e^2$, and $e′$ and the ratchet-wheel $d^{12}$ will also follow this movement of the drums E′, which can take place as the pawl $d^{10}$ has been withdrawn from engagement with the teeth of the ratchet-wheel $d^{12}$, so that the latter is consequently entirely independent from the spring-barrel D and the U-shaped disk $d^5$.

The gear-wheels $e^5$ $e^6$ on the shafts of the winding-drums E mesh with pinions $e^7$ of intermediate shafts, $e^8$, which mesh again by gear-wheels $e^9$ with pinions $e^{10}$ on shafts $e^{11}$, to which gear-wheels $e^{12}$ are applied, which mesh with pinions $e^{13}$ on short hollow shafts $e^{14}$, which are supported on a fixed shaft, $e^{17}$, the inner ends of which are provided with bevel-gears $e^{15}$, which mesh with a bevel-wheel, $e^{16}$, at the upper end of the tubular fan-shaft $A^2$, as will be clearly seen by reference to Figs. 3 and 4.

The descending action of the weight E imparts by the transmitting clock-train rotary motion to the fan until the weight has descended to its lowermost position near the fan-hub. When it arrives in this position, it is necessary to rewind the weight by the winding-cord C. This is accomplished by alternately pulling down the winding-cord C and releasing it again, whereby the suspension-cords $e$ of the weight E are gradually wound upon the drums E', and thereby the weight raised to its uppermost position below the bottom of the casing B, in which position the rotary motion of the fan is continued.

The clock-train can also be driven by means of springs, by the use of which the construction of the clock-train can be considerably simplified and the length of the fan-shaft reduced, so as to adapt the same to rooms of smaller height. This arrangement is illustrated in Figs. 19 to 24. When the spring-barrel D is turned to the left by the cord C, it carries a ratchet-wheel, $g$, along by means of a spring-pawl, $g'$, pivoted to the barrel D, as shown in Fig. 17. The ratchet-wheel $g$ is keyed to a tubular shaft, $g^2$, which is placed on the fixed shaft of the spring-barrel D. A second ratchet-wheel, $g^3$, is placed on the hollow shaft $g^2$ and engaged by a check-pawl, $g^4$, the lower end of which is attached to the sleeve $C^3$. The mainspring F is attached at its inner end to the hollow shaft $g^2$ and at its outer end to the main barrel F'. The sleeve $C^3$ is provided with a longitudinal rib carrying journal-bearing $g^5$ at the upper end for supporting the shaft $g^2$.

The pulling of the winding-cord C produces the turning of the spring-barrel D and the turning of the hollow shaft $g^2$ by the ratchet-wheel $g$ and pawl $g'$ and the winding up of the mainspring F on the hollow shaft $g^2$. The check-pawl $g^4$ moves during this motion of the spring-barrel D over the teeth of the ratchet-wheel $g^3$, but engages the same as soon as the downward pulling of the cord C is interrupted. As soon as the cord C is released the spring-barrel D is turned to the right by its spring and winds up the cord C again. The pawl $g^4$ retains the shaft $g^2$ and the ratchet-wheels $g$ $g^3$ in position and prevents them from following the motion of the spring-barrel D. By alternately pulling and releasing the cord C the mainspring F is gradually wound up and in a condition to drive the actuating-clock train, it being in a direction opposite to that of the spring of the barrel D.

In Figs. 21 and 22 the main barrel F' carries a gear-wheel, $g^6$, (shown in Fig. 18,) which meshes with the gear-wheel $e^2$ and intermediate gear-wheel, $e^3$, so as to drive the clock-train, and thereby the fan-shaft, in the same manner as before described with reference to the weight.

Figs. 23 and 24 show a still more simplified construction of the clock-train driven by a spring, as in this construction the sleeve $C^3$ is located somewhat lower down in the supporting-frame, and the gear-wheels $g^6$ and $e^3$ are dispensed with. The gear-wheel $e^2$ is in this case applied to the main barrel F, as shown in Fig. 18$^a$, and meshes directly with the gear-wheel $e^4$ and left-hand pinion $e^7$ so as to drive the clock-train and rotate the fan-shaft, as before described.

For most purposes it is preferable to drive the fan by spring-power in place of by a weight, as a smaller space is required for the driving mechanism, and as the construction of the clock-train is simpler than when the fan is driven by a weight.

Having thus described my invention, I claim as new and desire to secure by Letters Patent—

1. The combination of a tubular fan-shaft, a fan mounted on the same, a prime motor, a train of transmitting-gearing between said motor and the fan-shaft, a spring-barrel, a cord for winding up said spring-barrel, a fixed guide-tube for said cord located inside of the tubular fan-shaft, and a pawl-and-ratchet mechanism between the spring-barrel and train of gearing for winding up the spring-barrel and motor, whereby the latter is either wound up or released for actuating the clock-train and fan-shaft, substantially as set forth.

2. The combination of a tubular fan-shaft, a fan mounted on the same, a prime motor, a train of gear-wheels between said motor and the fan-shaft, a winding-up spring-barrel, a cord for winding up said barrel, a fixed guide-tube for said cord located inside of the tubular fan-shaft, an anti-friction bearing for the fan-shaft at the lower end of the guide-tube, a second anti-friction bearing for the upper end of the fan-shaft, and a pawl-and-ratchet mechanism between the spring-barrel and motor-barrel, substantially as set forth.

3. The combination of a supporting-frame having fixed sleeves, a guide-tube secured to said sleeves, a tubular fan-shaft inclosing said guide-tube, a fan mounted on said fan-shaft, a prime motor, an intermediate train of gear-wheels between said motor and the fan-shaft, a spring-barrel, a cord for winding up said spring-barrel, said cord being passed through the guide-tube and attached to the spring-barrel, and a pawl-and-ratchet mechanism between the spring-barrel and motor-barrel, substantially as set forth.

In testimony that I claim the foregoing as my invention I have signed my name in presence of two subscribing witnesses.

RICHARD GODEFFROY.

Witnesses:
MYER COHEN,
HERMANN EDEL.